United States Patent
Pontzer et al.

(10) Patent No.: US 7,621,734 B2
(45) Date of Patent: Nov. 24, 2009

(54) APPARATUS AND PROCESS FOR PREPARING CONFECTIONERY HAVING AN INCLUSION THEREIN USING FORMING ROLLS AND A FORMING PIN

(75) Inventors: David Pontzer, Sparta, NJ (US); Peter T. Kashulines, Jr., Mountain Lakes, NJ (US); Bob Crossley, Montclair, NJ (US); Thomas Collins, Nazareth, PA (US)

(73) Assignee: Mars, Incorporated, McLean, VA (US)

( * ) Notice: Subject to any disclaimer, the term of this patent is extended or adjusted under 35 U.S.C. 154(b) by 641 days.

(21) Appl. No.: 10/900,174

(22) Filed: Jul. 28, 2004

(65) Prior Publication Data

US 2006/0024411 A1    Feb. 2, 2006

(51) Int. Cl.
    A23G 3/20    (2006.01)
(52) U.S. Cl. .............. 425/237; 426/512; 426/514; 99/450.7; 425/449
(58) Field of Classification Search ................ 426/514, 426/103, 512, 279–282, 660; 99/450.7, 450.1; 425/408, 237
    See application file for complete search history.

(56) References Cited

U.S. PATENT DOCUMENTS

| | | | | |
|---|---|---|---|---|
| 2,318,718 A | * | 5/1943 | Scherer | 53/451 |
| 2,387,747 A | * | 10/1945 | Cowley | 53/454 |
| 2,497,212 A | * | 2/1950 | Donofrio | 53/443 |
| 4,241,649 A | * | 12/1980 | Nelson et al. | 99/354 |
| 5,000,084 A | * | 3/1991 | Walliker | 99/354 |
| 5,358,727 A | * | 10/1994 | Yates et al. | 426/512 |
| 5,558,894 A | * | 9/1996 | Henson et al. | 426/498 |
| 6,261,620 B1 | * | 7/2001 | Leadbeater | 426/515 |
| 6,270,826 B1 | | 8/2001 | Kashulines, Jr. et al. | 426/512 |
| 6,402,496 B2 | * | 6/2002 | Ishikawa et al. | 425/116 |
| 6,660,197 B1 | * | 12/2003 | Buch-Rasmussen et al. | 264/120 |

FOREIGN PATENT DOCUMENTS

JP        61028348 A    *    2/1986

OTHER PUBLICATIONS

JP 61028348 English translation; 1984.*
B.W. Minifie, "Chocolate, Cocoa, and Confectionery Science and Technology," 3rd Ed., 1999, pp. 184-186, 221-223, 506, 608-609 and 613.

* cited by examiner

Primary Examiner—Drew E Becker
Assistant Examiner—Steven Leff
(74) Attorney, Agent, or Firm—Fitzpatrick, Cella, Harper & Scinto

(57) ABSTRACT

The present invention is directed to a forming apparatus comprising (a) first and second forming rolls with forming pockets in corresponding alignment, wherein at least one roll has one or more continuous grooves extending around the circumference of the roll in a plane perpendicular to the longitudinal axis of the roll and which intersects the forming pockets in the plane, wherein the first and second forming rolls rotate in directions counter to one another, and (b) one or more forming pins positioned between the counter rotating rolls and within the continuous groove of the roll.

8 Claims, 9 Drawing Sheets

DETAIL A
SCALE 1 : 1

DETAIL A
SCALE 1:1

APPARATUS AND PROCESS FOR PREPARING CONFECTIONERY HAVING AN INCLUSION THEREIN USING FORMING ROLLS AND A FORMING PIN

BACKGROUND OF THE INVENTION

1. Field of the Invention

The present invention relates to an apparatus and process for making shaped confectionery products from a fat based material, e.g., chocolate. More particularly, the present invention relates to an apparatus and process used in making shaped confectionery centers by a forming process, such as cold forming, where the shaped confectionery centers have an internal hollow section.

2. Description of the Related Art

Confectionery centers may be manufactured by various methods, including drop roll forming techniques where a liquid material is deposited through a set of forming rolls or cold forming of centers from solid particulate. Drop roll forming is well known in the art and described in "Chocolate, Cocoa, and Confectionery Science and Technology," $3^{rd}$ ed., (1999) pp. 184-186, by B. W. Minifie. Cold forming is described in U.S. Pat. No. 6,270,826 for forming confectionery centers by taking solid particles of a fat based material such as chocolate flakes and compressing the particles in a set of forming rolls. The confectionery centers produced from either of these methods are typically further processed by applying a sugar shell coating over the outside of the centers.

When these sugar shelled confectionery products have a fat based center, they tend to develop quality problems when exposed to heat. This is evident in warm climates where shell cracking and fat bleeding are major consumer issues. The heat in the warm climate causes thermal expansion, which leads to cracks in the shell and ultimately enables fat to bleed through the shell.

One method that has been found to reduce thermal expansion issues is to aerate the fat based material that is used to form the fat based center. Compressed air is added into the fat based material when it is a liquid to create a homogenous dispersion of small void spaces. It is hypothesized that when thermal treatment is applied, e.g. higher temperatures, the presence of the hollow section in the formed confectionery center enables the fat based material to expand partially into the void space, thus reducing the expansion forces on the shell.

However, aeration methods have several disadvantages. When drop roll forming methods are used to form centers from liquid, the level of aeration in the formed confectionery center is very limited. Typically, the pressure exerted by the drop rolls squeezes some of the compressed air out of the fat based material as the fat based centers are formed. As this process occurs, air trapped in the liquid is squeezed out and released into the environment. Prior art aeration techniques with liquid chocolate have only managed to incorporate less than 4.65% by weight of the air into the fat based material. However, at these low levels of aeration the benefit is only apparent up to certain temperatures. A higher level of aeration is desirable to increase the benefits gained from the void spaces, further reducing and eliminating expansion and cracking defects. Aerating the fat based material when using drop rolls can also be costly, creating a continuous expense since compressed air must be constantly blended into the fat based material. Moreover, aeration techniques add to the complexity of the manufacturing process and often produce inconsistent results.

When using cold forming technology, it is not possible to use aeration to form a confectionery center with void spaces. As mentioned above, compressed air can be added to a liquid to create an aerated material. In cold forming technology, solid particles are compressed to form a shaped confectionery center. This would require having the liquid aerated confectionery material first be solidified then formed into small particulates before forming it into shaped centers. This process would destroy much of the voids created during aeration. Additionally, the cold forming process itself would exert a higher level of pressure on the confectionery material than a drop roll process compressing and releasing much of the trapped air.

A means of preventing or reducing product issues related to heat exposure would improve product quality and be more appealing to consumers. A means of creating confectionery centers produced by cold forming, which have the benefits of aeration is needed. Overall, a higher level of void spaces (aeration or density reduction) is desired for increased benefits in product quality of sugar shelled confectionery centers.

SUMMARY OF THE INVENTION

The present invention is directed to a forming apparatus comprising (a) first and second forming rolls with forming pockets in corresponding alignment, wherein at least one roll has one or more continuous grooves extending around the circumference of the roll in a plane perpendicular to the longitudinal axis of the roll and which intersects the forming pockets in the plane, wherein the first and second forming rolls rotate in directions counter to one another, and (b) one or more forming pins positioned between the counter rotating rolls and within the continuous groove of the roll.

In another aspect, the present invention also includes a process for manufacturing a shaped confectionery product. The method comprises the steps of (a) providing a fat based material to a forming apparatus, wherein the forming apparatus comprises (i) first and second forming rolls with forming pockets in corresponding alignment, wherein at least one roll has one or more continuous grooves extending around the circumference of the roll in a plane perpendicular to the longitudinal axis of the roll and which intersects the forming pockets in the plane, and wherein the first and second forming rolls rotate in directions counter to one another; and (ii) one or more forming pins positioned between the counter rotating rolls and within the continuous grooves of the rolls; (b) forcing the fat based material through the forming apparatus, thereby substantially forming the shaped confectionery product; and (c) optionally, cooling the shaped confectionery product.

In another embodiment of the present invention, a panned sugar shelled confectionery is made by the process comprising the steps of (a) providing a fat based material to a forming apparatus, wherein the forming apparatus comprises (i) first and second forming rolls with corresponding forming pockets, wherein at least one roll has one or more continuous grooves extending around the circumference of the roll in a plane perpendicular to the longitudinal axis of the roll and which intersects the forming pockets in the plane; and wherein the first and second forming rolls rotate in a direction counter to one another, and (ii) at least one forming pin positioned between the counter rotating rolls and within the continuous grooves of the rolls; (b) forcing the fat based material through the forming apparatus, thereby forming shaped confectionery centers; (c) applying a coating onto the shaped confectionery centers, thereby forming the panned sugar shelled confectionery; and (d) optionally, including one or more of the following steps: (i) cooling the shaped confectionery centers after the shaping step; (ii) deflashing a webbing formed during the shaping step; and (iii) rolling the shaped confectionery centers after the shaping step.

The invention also includes a panned sugar shelled product having a center that has a percent density reduction of at least about 5%. Preferably, the center is a chocolate center.

BRIEF DESCRIPTION OF THE DRAWINGS

FIG. 9b is a top view of the forming pin of FIG. 9a.

DETAILED DESCRIPTION OF THE INVENTION

For the purposes of this invention, "fat-based" refers to a material having a fat or lipid continuous phase in which material components such as, for example, milk proteins and sugars are dispersed.

The term "chocolate" is intended to refer to all chocolate or chocolate-like compositions with a fat phase or fat-like composition. The term is intended, for example, to include standardized and non-standardized chocolates, i.e., including chocolates with compositions conforming to the U.S. Standards Of Identity (SOI) and compositions not conforming to the U.S. Standards Of Identity, respectively, including dark chocolate, baking chocolate, milk chocolate, sweet chocolate, semi-sweet chocolate, buttermilk chocolate, skim-milk chocolate, mixed dairy product chocolate, low fat chocolate, white chocolate, aerated chocolates, compound coatings, non-standardized chocolates and chocolate-like compositions, unless specifically identified otherwise.

The presence of a void or hollow section in a product made by the process of the invention results in a reduction in product density. Visually, the product of the invention appears to be solid. However, the hollow section formed within the product decreases the weight of the product. As the volume of the hollow section increases, the density of the product decreases. The change in density can be quantified by calculating the percent density reduction.

The equation $$(w1-w2)/w1 \times 100\%$$

is used to calculate the percent density reduction, where w1 is equal to the total weight of the a formed center prior to treatment, and w2 is equal to the total weight of the product after treatment. Alternatively, the equation $$(d1-d2)/d1 \times 100\%$$

maybe used, where d1 is equal to the density of the center prior to treatment, and d2 is the density of the center after treatment. The density of a product made using the forming pin of this invention has a void or hollow section that results in a lower density value than a similar product that is solid and made of the same material.

For example, two chocolate products are made using a cold forming process. The first product is made using the method described in U.S. Pat. No. 6,270,826, where solid center pieces are produced. The second product is made using the process of the invention where a pin is used to form a void in the center pieces. The first product has a density of about 1.29 g/cc, and the second product has a density of about 1.23 g/cc. The difference in densities between the two products divided by the density of the solid center pieces provides the percent density reduction of the product. In this case the percent density reduction is 4.65%.

Figure 1:
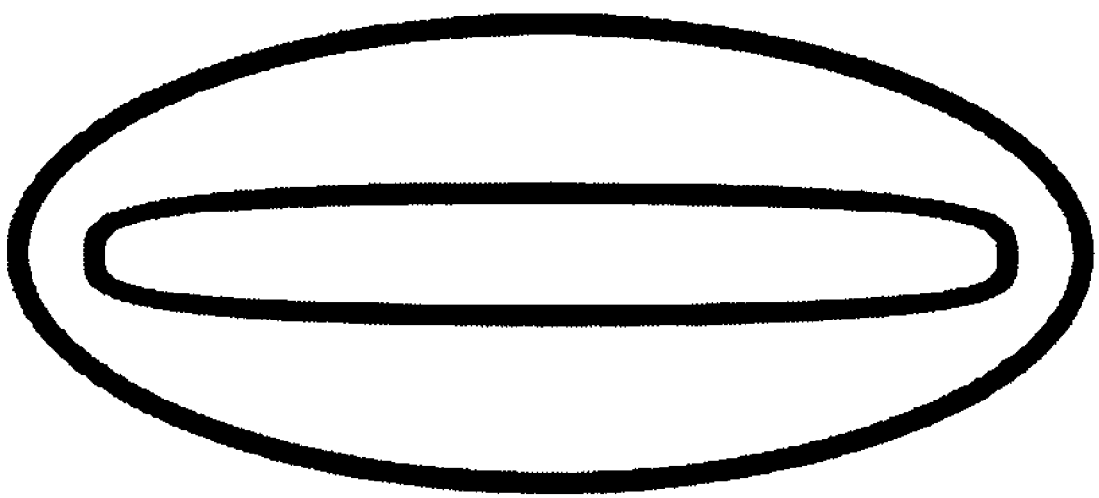
FIG. 1 is a schematic representation of a cross sectional view of a shaped chocolate center made using the apparatus of the invention.

In FIG. 1, a schematic representation of a cross sectional view of the internal body of a shaped confectionery center is shown revealing a hollow section formed by the pin. In this particular embodiment, the hollow section has ends that are sealed by the fat based material and the hollow section extends through a substantial portion of the center. The sealed ends are formed during processing by a lip projecting from the body of the shaped confectionery center adjacent to the hole, which is folded into the hole as the center is rolled. It becomes apparent that the density of the shaped confectionery piece of the invention is less than a solid piece of similar size.

The hollow section formed within the shaped product has been found to provide desirable quality benefits. The inventors have discovered that the presence of the hollow section in the confectionery product increases the robustness of the shelled shaped confectionery product when exposed to higher temperatures. The result is a lower incidence of cracking and fat bleeding through the shell. This has been confirmed through thermal cycle testing which demonstrates the robustness of the shelled shaped confectionery product of the invention. It is hypothesized that when thermal treatment is applied, the presence of the hollow section enables the fat based material to expand partially into the void space, thus reducing the expansion forces on the shell and keeping it from cracking. By maintaining the shell's integrity the likelihood of fat, e.g., cocoa butter, bleeding through the shell is dramatically reduced. This provides a solution to the product issues encountered in warm climates, where heat exposure may detrimentally affect the product's exterior.

The forming apparatus of the present invention includes a forming device and at least one forming pin. Various forming devices may be used, such as, drop rolls, which are described by B. W. Minifie, in his book titled, "Chocolate, Cocoa, and Confectionery Science and Technology," 3$^{rd}$ ed., (1999) pp. 184-186, the contents of which are incorporated by reference. Another example of a forming device is a cold forming device, such as the one described in U.S. Pat. No. 6,270,826. Preferably, the forming device is a cold forming apparatus comprised of first and second forming rolls which have corresponding forming cavities/pockets in each roll. The forming pockets mate as the forming rolls rotate. The rolls are mounted for counter rotation with no or a slight space between the rolls and a hopper is provided above the counter-rotating rolls to direct, by a gravity feed, the confectionery material in the form of flakes, shavings or granules to the rolls. The counter-rotating rolls draw the fat based material, e.g.

chocolate pieces, down between the nip of the rolls to compress and compact the chocolate pieces in a process akin to sintering to form the chocolate into the desired shape. The chocolate leaves the rolls in a downward direction in sheet form with the formed chocolate pieces interconnected by a thin web of chocolate. The depression on each roll need not be identical as a character figure can be made with a back side and a front side which is different. The important consideration is that each impression as it mates in the nip aligned so that a piece is formed having similar radial dimensions.

Another important feature is a continuous groove which extends around the circumference of at least one of the rolls in a plane perpendicular to the longitudinal axis of the roll and which intersects the forming pockets in the same plane. In a preferred embodiment, each forming roll has a groove, where the groove in one roll is matched to a corresponding groove in the other roll. Preferably, there are multiple grooves with matching corresponding grooves. Thus, when the rolls are in proper alignment and contact with one another, the grooves line up to form a channel. In one embodiment, more than one continuous groove intersects a single forming pocket.

The forming pin is the other essential component of the apparatus of the invention. The pin preferably has a long narrow body. Ideally, the pin is an elongated cylindrical rod. However the pin may be, for example, an elongated rectangular, square, oval, triangular, or other elongated rod shaped variant. The main criteria is that the pin fit into the groove where the tolerance is such that the pin does not contact or interfere with the forming rolls as they rotate. Yet the pin should fit close enough in the groove to prohibit the fat based material from building up in the space between the groove and the pin where the forming rolls meet. Ideally, the tolerance between the pin and the groove is about 0.01 to about 0.02 inches (about 0.25 mm to about 0.51 mm).

The dimensions of the pin are dependent upon several factors including product design requirements, the desired mechanical strength of the formed shaped pieces, and the shape of the shaped product. As a general guideline, the width and depth of the forming pin is about 10% to about 80% of the width and depth of the forming pocket. Preferably the width and depth is about 25% to 75%, and more preferably about 35% to 70% of the width and depth of the forming pocket. The length of the pin is generally designed so that when it is attached to the structure supporting it, the body of the pin extends beyond the length of the forming pocket as it mates in the nip. Alternatively, the forming pin may be characterized by the volume it displaces in the shaped product in percentage terms. Typically, the forming pin is sized to fill or displace about 0.05% to about 70% by volume (vol. %) of the total volume of the shaped product formed. Preferably about 4 vol. % to about 65 vol. %, more preferably about 4.5 vol. % to about 60 vol. %, and even more preferably 5.0% to 60% is displaced by the forming pin. Additionally, the pin should be sized to provide a shaped product that has at least a minimal amount of wall material to give the shaped product sufficient mechanical strength to maintain its' shape during forming and post processing. This is largely a function of the properties of the fat based material.

The forming pin is preferably constructed of a metal that has a surface hardness, which will resist wearing of the pin. A preferred choice of metal is anodized aluminum, which is very hard and wear resistant and provides high tensile strength. However, other metals such as for example, carbon steel, stainless steel, and the like may be used to construct the pin. Metal also provides the pin with good thermal conductivity properties, which may be useful to maintain the optimal surface temperature of the pin. For example, to minimize chocolate sticking to the pin, it is important to maintain the temperature above 20° C. In addition, the required mechanical properties of the metal, the shape geometry, and lengths are important to maintain alignment and prevent contact between the forming rolls and the pin.

A surface adhesion reducing agent such as Teflon, silicone, and the like may be used to treat the pin. Preferably, the surface adhesion reducing agent is Teflon. The presence of the coating reduces sticking of the fat based material to the pin. The pin may also be treated with a temporary coating that functions as a surface adhesion reducing agent or if warranted a permanent coating may be applied.

As previously mentioned, the pin is positioned in the apparatus of the invention so that it fits into a groove, ideally where the forming rolls meet in the nip. By adjusting the height of the end of the pin relative to the nip of the roll, the cavity created by the pin may be varied. In a preferred embodiment the pin is mounted above the nip region and is positioned so the body of the pin extends just beyond the bottom of the forming cavity when that forming cavity is centered at the nip of the forming rolls. Any suitable means may be used to support the pin in such a position, so long as it does not interfere with the movement of the forming rolls. In one embodiment, a bridge is constructed between opposing walls of the hopper positioned above the rolls, and the forming pins are suspended from the bridge.

Moreover, the pin may be situated in a fixed position that is aligned between the rolls. In an alternative embodiment, the pin may oscillate and/or vibrate. The oscillating and/or vibrating motion, aids in forming an empty cavity and assists in reducing the adhesion of the fat based product to the pin.

As described above, the forming pin serves to create a void within the center piece that is formed. However, the pin may also provide other useful purposes. For example, the pin may function as a probe, which senses for example, temperature and/or viscosity. In another embodiment, the pin may be designed with heating and/or cooling means.

In a preferred embodiment, the inside of the pin is hollow and there is a hole in the body of the pin. Preferably the hole is located in close proximity to the head of the pin. In such a configuration, the pin can be used to inject a filling into the center of a shaped piece. For example, the inside of the pin can be used to hold a filling, which can be injected into the empty cavity created by the pin. Preferably, the filling is injected intermittently so that it will fill the centers but not the web.

A variety of fillings may be added through the pin. For example, the filling may be caramel, nougat, jelly, cream, a flavored liquid, mixtures thereof, and the like.

Furthermore, an outer coating may be applied over the center pieces. Typically, the coating is applied using a panning operation. For example, the shaped confectionery centers may be coated with a sugar shell coating. The percent shell coating that is applied will impact the overall design of the product in several ways, including the perceived crunch of the product (e.g., too little or too much crunch), the amount of coverage over the product, and the adherence of the shell to the shaped center. The outer coating that is applied is preferably about 15% to about 40% by weight of the total weight of the shaped confectionery product, preferably about 20% to about 38%, and most preferably about 23% to about 35%. In a preferred embodiment, a hard panned sugar shell is applied over the shaped center.

The apparatus of the present invention is used for manufacturing a shaped confectionery product, e.g., confectionery centers. The method of manufacturing such products comprises the steps of (a) providing a fat based material to a forming apparatus, wherein the forming apparatus comprises (i) first and second forming rolls with forming pockets in corresponding alignment, wherein at least one roll has one or more continuous grooves extending around the circumference of the roll in a plane perpendicular to the longitudinal axis of the roll and which intersects the forming pockets in the plane, and wherein the first and second forming rolls rotate in directions counter to one another; and (ii) one or more forming pins positioned between the counter rotating rolls and within the continuous grooves of the rolls; (b) forcing the fat based material through the forming apparatus, thereby substantially forming the shaped confectionery product; and (c) optionally, cooling the shaped confectionery product. In addition, a filling may be added by injecting the filling through the forming pin.

Preferably the fat based material is a free flowable particulate material, which has a particle diameter less than one half the diameter of the forming pocket. It has been found that smaller particles have no detrimental effect on the process, while large particles may lead to insufficiently filled pockets that yield incomplete centers.

The fat based material may be any edible material having a continuous fat or lipid phase. The preferred fat based material is chocolate.

The forcing step compacts and compresses the flowable particulate, i.e. fat based material into the desired shape.

In a preferred embodiment the shaped confectionery centers have a density reduction of at least about 5%. It is also desirable that these centers have non-homogenous void spaces. One, two, or three void spaces are preferred.

The shaped confectionery centers may be treated to a deflashing step to remove the webbing formed during the shaping step. Typically, the fat based material passes through the forming rolls producing a sheet containing the shaped centers. The sheet is then cooled in a cooling tunnel or chamber and then sent to a deflashing operation. Here, the shaped confectionery centers are agitated to break apart the webbing of the sheet and smooth the edges where the web interconnects the formed pieces. One effective method of removing the webbing is to roll the shaped centers in a rotating drum or tube, where perforations are placed along the drum or tube walls. To prevent the shaped centers from falling through the perforations, the perforations are sized smaller than the shaped centers. Alternatively, the shaped centers may be placed on a perforated vibratory conveyor or screen to remove the webbing. In a more preferred embodiment the shaped confectionery centers are treated to a rolling step. Typically after the deflash step, rough edges and small pieces from the webbing remain the centers. During the rolling step, the centers are rolled in a drum or tube. The forced motion of the centers against other centers and the pressing action of the centers against the edges of the tube or drum creates friction which slightly warms the centers and smoothes the rough edges, removing the excess chocolate remaining on the centers. Deflashing or rolling may be performed on a batch or continuous basis.

The shaped confectionery centers may then be further processed, if desired, by applying a sugar shell coating. A detailed description of panning can be found in B. W. Minifle, "Chocolate, Cocoa, and Confectionery Science and Technology," $3^{rd}$ ed., (1999) pp. 184, 221-223, 506, 608-609, and 613, the contents of which is incorporated by reference.

Figure 2:
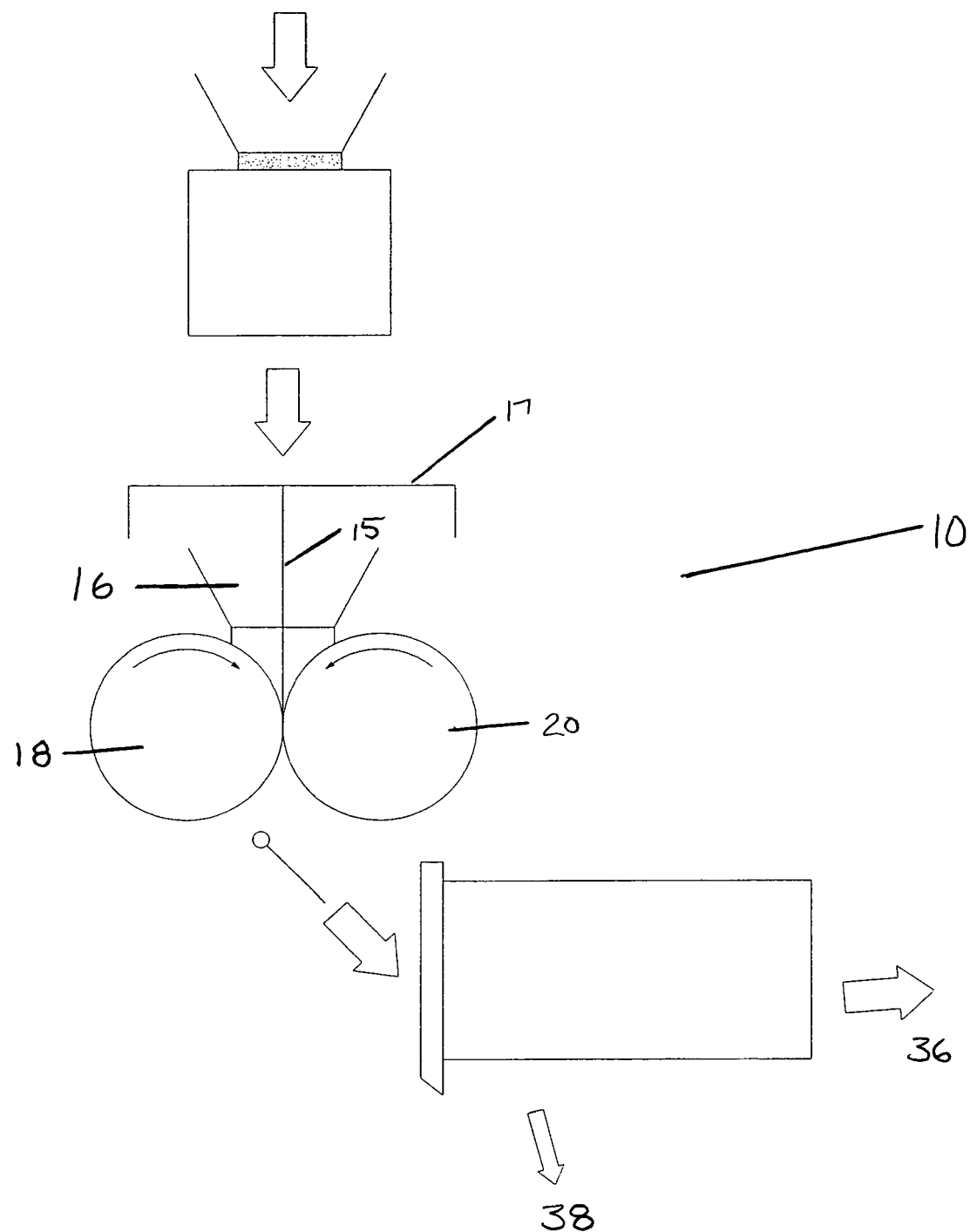
FIG. 2 is a schematic representation of the overall process and apparatus of the present invention.

In FIG. 2, apparatus 10 of the present invention includes a pair of counter-rotating forming rolls 18 and 20, which rotate toward each other in the direction indicated by the arrows. Forming rolls 18 and 20 are provided, as will be explained below, with forming pockets, which mate as the form rolls rotate, to force the fat based material into the forming pockets into the desired shape. In addition, at least one, preferably both rolls has at least one continuous groove which extends around the circumference of the roll in a plane perpendicular to the longitudinal axis of the roll. The continuous groove also intersects the forming pockets in the plane perpendicular to the longitudinal axis of the roll. Preferably, there are multiple grooves and corresponding grooves in the rolls. Above rolls 18 and 20 is hopper 16, which contains the fat based material that is fed into the rolls. Forming pin 15 extends downward from bridge 17 into hopper 16 and is positioned to rest in the channel formed at the meeting point where a longitudinal groove on roll 18 and a corresponding longitudinal groove on roll 20 meet.

Figure 3:
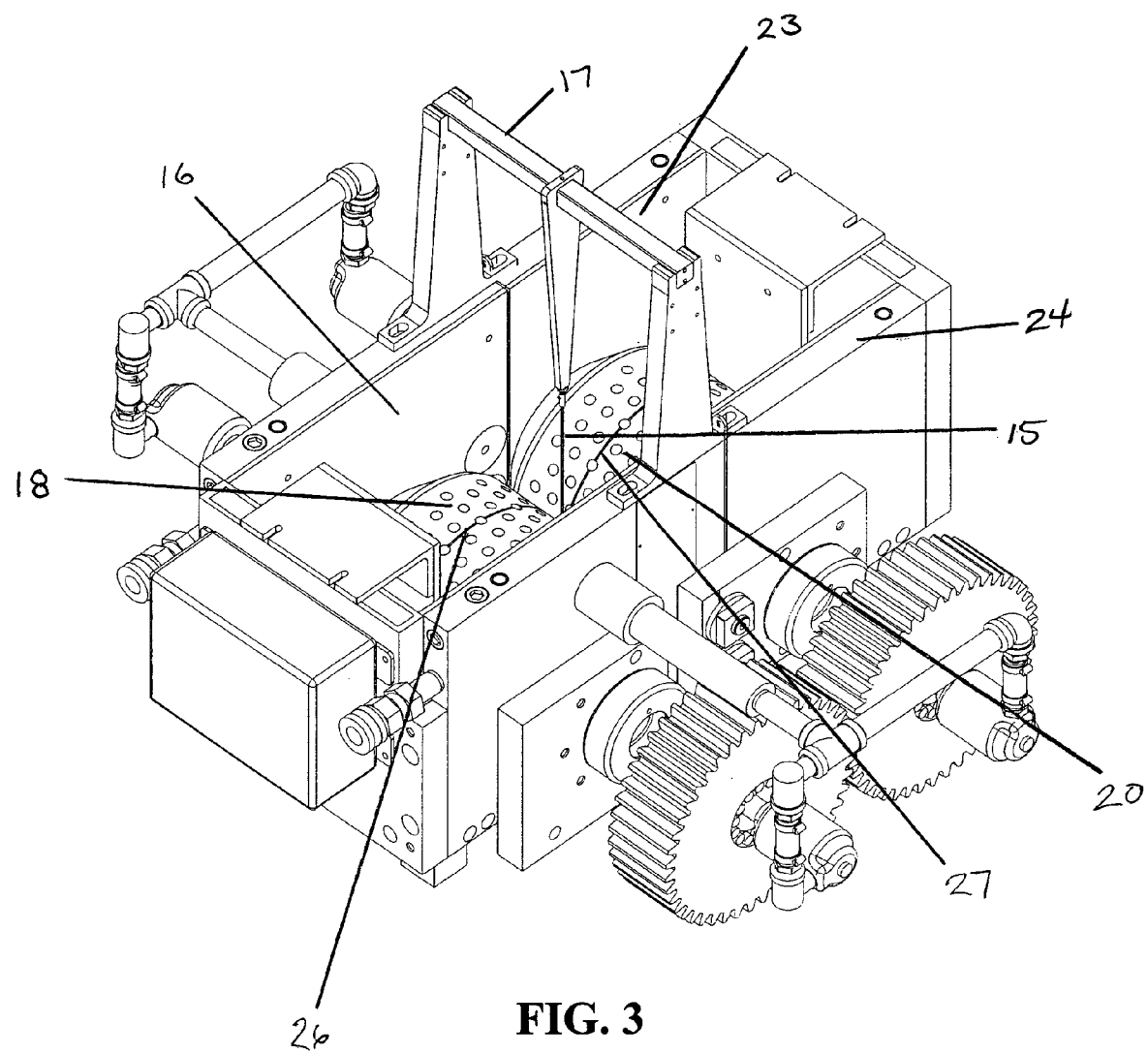
FIG. 3 is a partial perspective view showing the essential features of the apparatus of the present invention.

In FIG. 3, hopper 16 is positioned above forming rolls 18 and 20. Bridge 17 is positioned between hopper walls 23 and 24 of the hopper, so that forming pin 15 can be supported from the bridge. The end of the pin rests in the channel formed by grooves 26 and 27.

Figure 4:
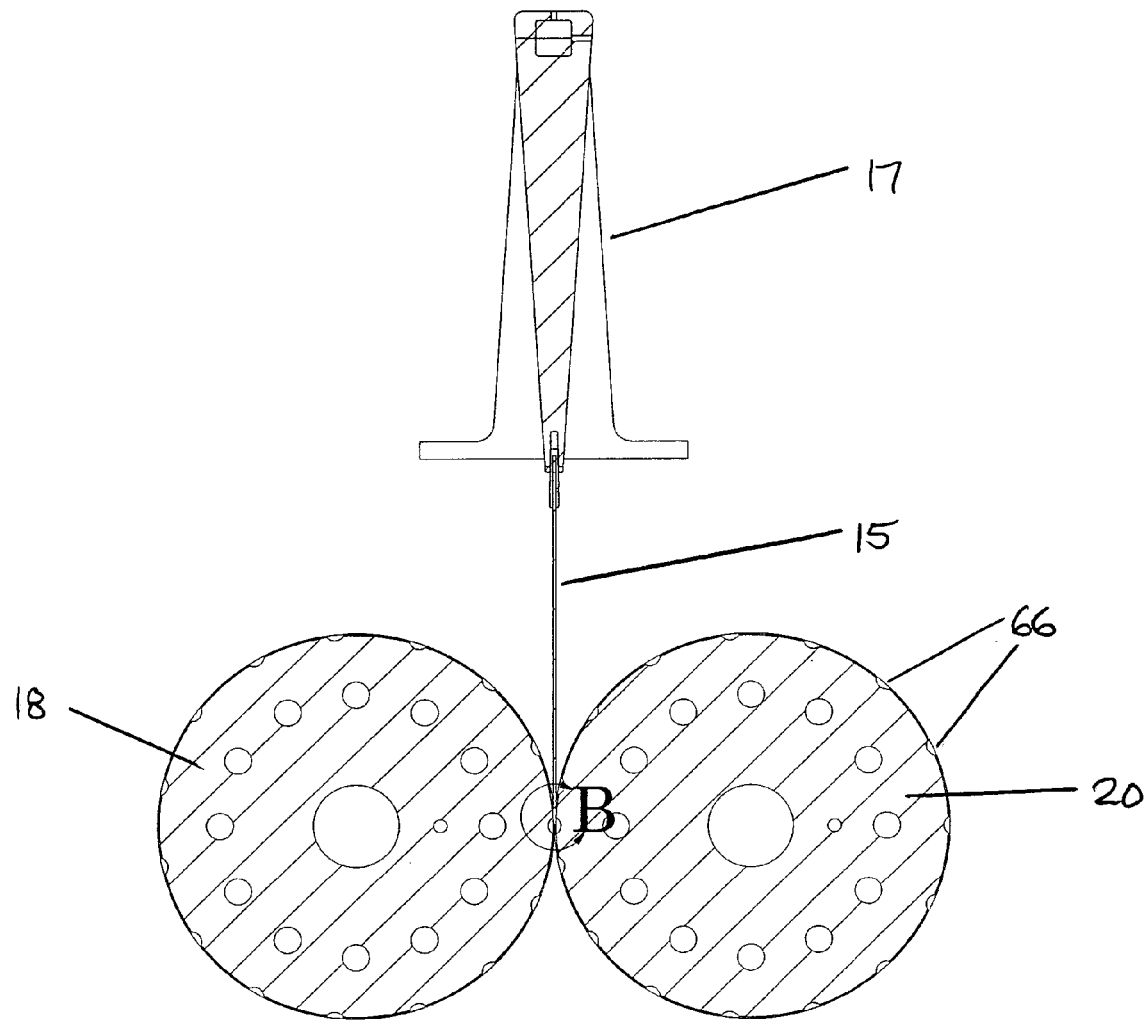
FIG. 4 is a cut away cross sectional view of a set of forming rolls and a forming pin.

In FIG. 4, a cut away side view is shown where forming pin 15 is positioned in the nip where forming rolls 18 and 20 meet. FIG. 4 also shows forming pockets 66, which are situated on the surface of the forming rolls. The forming pockets are positioned on the rolls so that they are in corresponding alignment.

In one particularly preferred embodiment, the forming pocket/cavity on at least one of the forming rolls is designed so that the resulting shaped confectionery centers have a lip or tail protruding from the main body of the confectionery centers. The lip or tail protrusion is in an area adjacent to the opening or openings, i.e. holes created by the pin or pins. During the rolling step, the lip or tail is forced over the opening and smoothed to seal it. If the opening is left unsealed, it could result in flaws in the subsequent coating, by panning for an example, such as an uneven surface or thin or no coating in some areas. The coating could be added at a higher percentage of the finished product to compensate, however this is not desirable as described previously.

Figure 5:
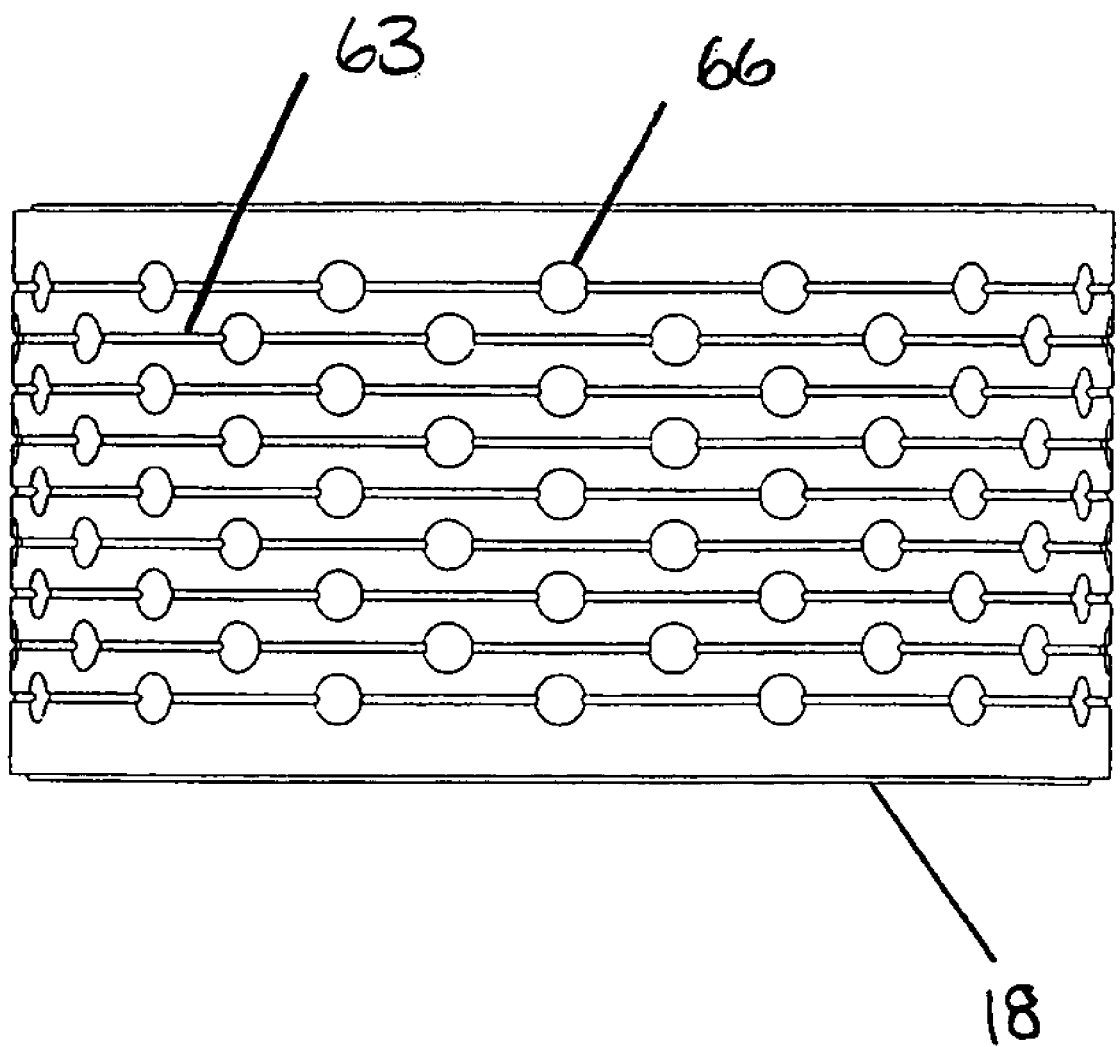
FIG. 5 is a top view of a forming roll illustrating one embodiment of forming pockets positioned on the forming roll to form a shaped product with a longitudinal groove.

In FIG. 5, a top view of the surface of form roll 18 of the invention is shown. Forming pockets 66 are laid out in a pattern which will align with forming pockets on form roll 20. Grooves 63 extend around the circumference of the roll in a plane perpendicular to the longitudinal axis of the roll. In addition, the grooves intersect the forming pockets in the plane.

Figure 6:
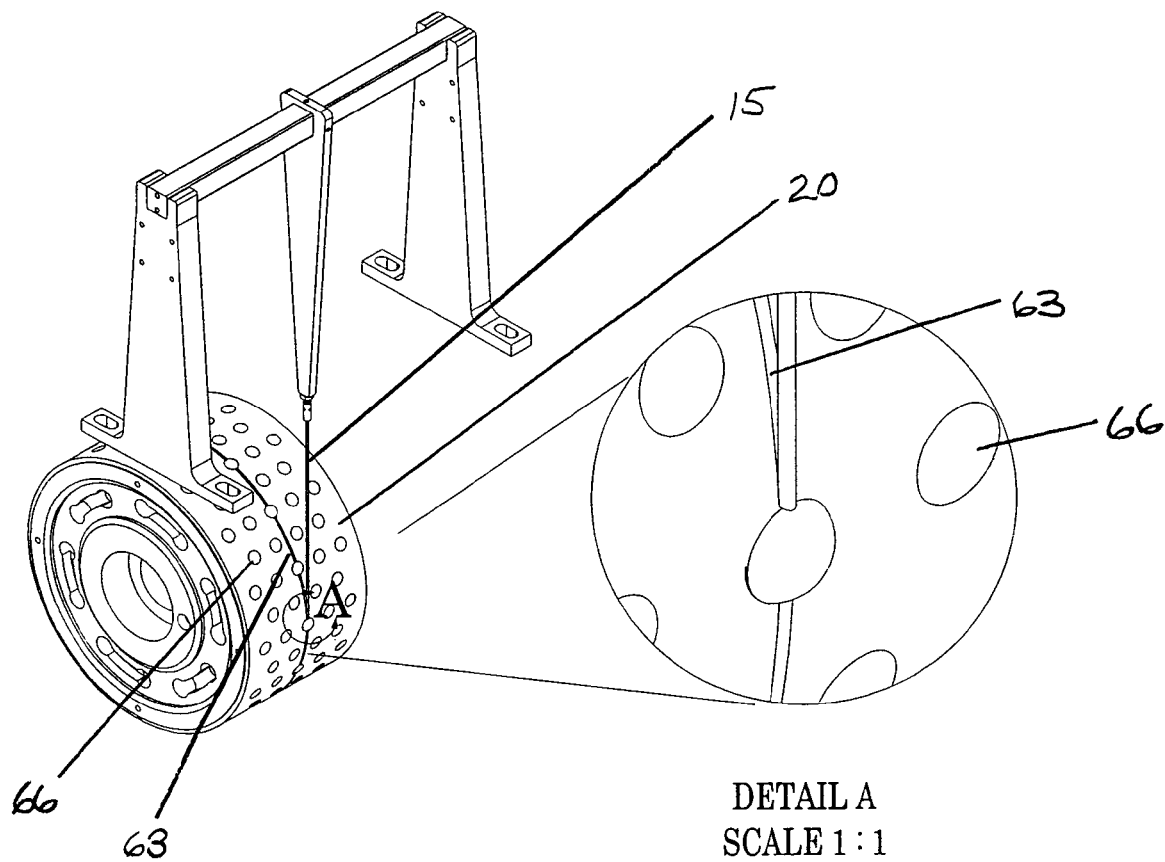
FIG. 6 shows a partial perspective view where a forming pin is positioned on a forming pocket and along a groove that extends along the circumference of the roll.

In FIG. 6, form roll 18 is shown with the end of forming pin 15 resting in forming pocket 66. Intersecting the forming pocket is groove 63.

Figure 7A:
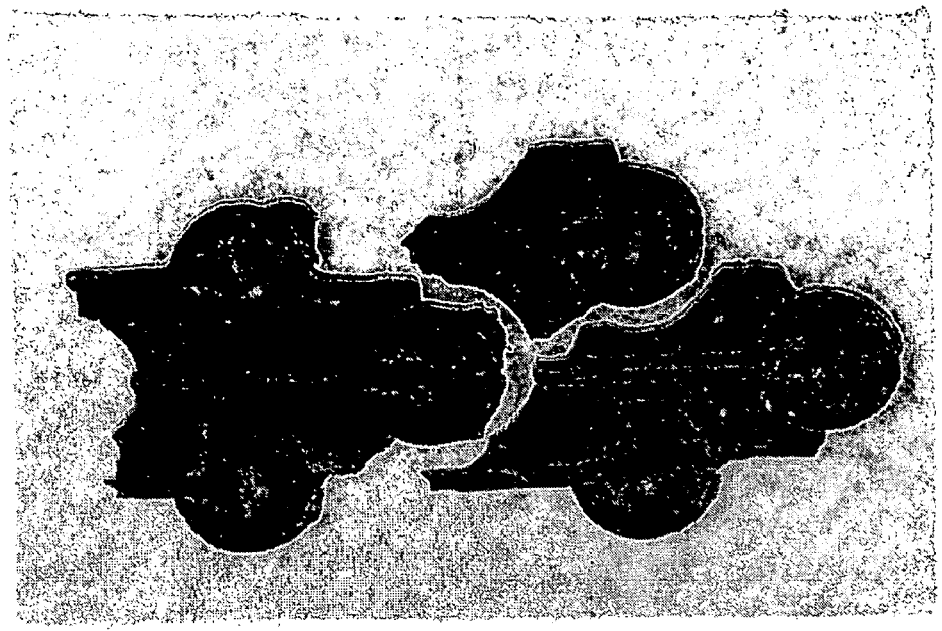
FIG. 7a is a top view of a portion of a sheet of chocolate centers made using the apparatus of the invention.

As previously discussed, the fat based material exits the forming rolls in the form of a continuous sheet. The sheet is comprised of compacted and cohesive shaped centers as well as a webbing between the centers. FIG. 7a shows a portion of a sheet that is formed using the apparatus of the invention, where the webbing has a raised channel extending between the shaped pieces formed.

Figure 7B:
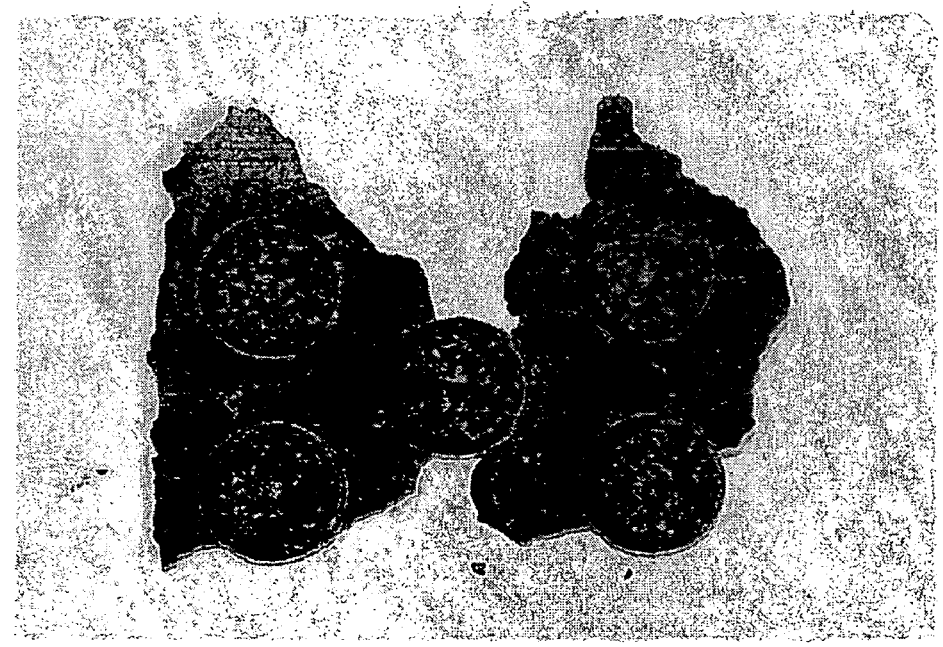
FIG. 7b is a top view of a portion of a sheet of chocolate centers made using standard forming rolls.

In contrast, the centers made using a standard forming apparatus are interconnected in a webbing that is primarily a flat sheet, as shown in FIG. 7b.

Referring back to FIG. 2, as the formed sheet exits the apparatus of the invention, it may be directed to a rotating deflash drum, which rotates to separate the formed shaped centers, e.g., chocolate centers from the thin interconnecting web. From the deflash drum the formed pieces are directed, as indicated by arrow 36, for further processing and the disconnected webs of the fat based material are directed, as indicated by arrow 38, to another location where it can be recovered and reused as a feed material in the process.

Forming pockets 66 may be of any desired shape to achieve the desired shaped confectionery product. In a preferred embodiment the forming pockets 66 are shaped to make a lentil shape for subsequent sugar shell coating to make a product such as M&M's® candy. It has been found that other desired shapes such as character figures, stars, hearts, eggs and other shapes may be employed as well. However, because of the nature of the fat based material, e.g., chocolate, has been found that shapes with a rounded peripheral extent are best to provide a good release angle to allow the formed sheet to readily disengage from the form rolls.

If the fat based material is chocolate, the chocolate flakes or granules at the start of the process are at ambient temperature. However, when it is compacted, the pressure exerted by the compressive force as the chocolate passes through the nips of the form rolls causes the surface of the chocolate in contact with the form rolls to rise and would result in the chocolate adhering to the surface of the form rolls so as to retard the release of the formed sheet from the form rolls. Accordingly, it is desirable to provide coolant to maintain the surface of the form rolls within a preferred temperature range of 14° C. to 20° C.

The diameter of the forming roll is partially dependent upon the overall size of the piece to be formed to insure repeatable disengagement of the sheet from the form roll without degradation of the product shape. It has been found that with form rolls having an outer diameter of about 28 cm to form a lentil shape as used for the size of an M&M's® candy a forming cavity having an length and width of about 12.19 mm and a maximum depth of about 2.74 mm may be effectively employed.

Typically, a matching set of forming pockets will have one forming pin, which may reside in a corresponding groove. In a particular embodiment, however, the apparatus of the present invention has two or more forming pins that intersect a matching set of forming pockets, where the forming pins each reside in corresponding grooves. The multiple pins enable a greater percent density reduction to be achieved, since the multiple pins result in higher void volumes in the shaped piece. When multiple pins are used, the pins are typically smaller in diameter. This requires greater care in designing the pins, which must take into account the pins proximity to the wall of the shaped piece and the strength of the pin, i.e., its resistance to bending.

In a preferred embodiment, the forming pockets are designed so that the resulting shaped confectionery centers have at least one lip or tail projection in an area adjacent to the opening or openings created by the pin or pins. The lip or tail is designed to fold into and over a substantial portion of the opening created by the pin during processing, i.e., as the centers are rolled.

Figure 8A:
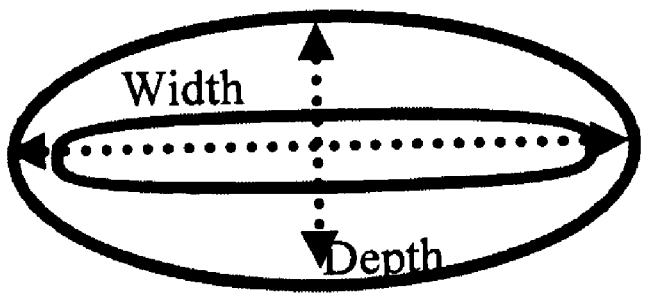
FIG. 8a is a schematic representation of a perspective view of a lentil shaped center with a void space sealed within the center.
Figure 8B:
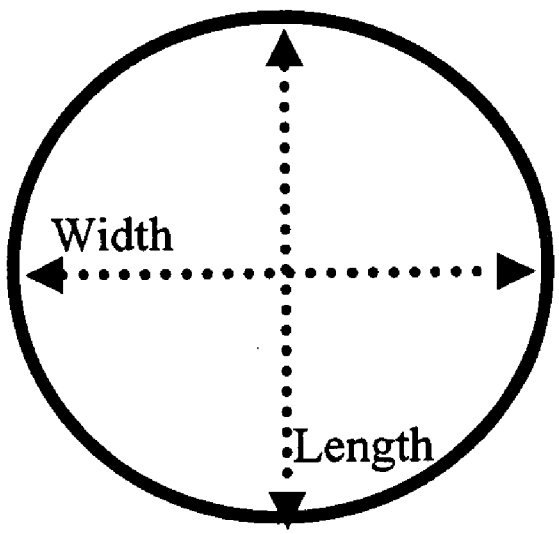
FIG. 8b is a schematic representation of a top view of a lentil shaped center.

In FIGS. 8*a* and 8*b*, a schematic representation of a shaped confectionery center made using the apparatus of the invention is shown. In FIG. 8*a* the width and depth of a center is shown, while FIG. 8*b* shows the width and length of the center.

Figure 9A:
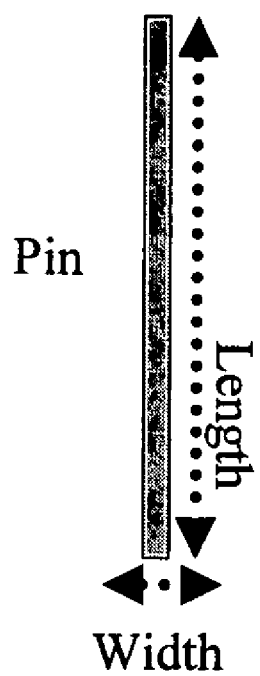
FIG. 9a is a perspective view of one embodiment of a forming pin.
Figure 9B:
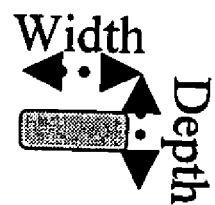

One embodiment of a forming pin is depicted in FIGS. 9*a* and 9*b*. FIG. 9*a* shows the forming pin in a perspective view where the length of the pin is apparent. In FIG. 9*b*, the top view enables the width and depth to be seen.

The shaped confectionery centers have a percent density reduction of at least about 5%, more preferably about 5.5%, even more preferably about 6%, still even more preferably about 6.5%, still even more preferably about 7%, still even more preferably about 7.5%, still even more preferably about 8%, still even more preferably about 8.5%, still even more preferably about 9%, still even more preferably about 9.5%, still even more preferably about 10%, still even more preferably about 10.5%, still even more preferably about 11%, still even more preferably about 11.5%, still even more preferably about 12%, still even more preferably about 12.5%, still even more preferably about 13%, still even more preferably about 13.5%, still even more preferably about 14%, still even more preferably about 14.5%, still even more preferably about 15%, still even more preferably about 15.5%, still even more preferably about 16%, still even more preferably about 16.5%, still even more preferably about 17%, still even more preferably about 17.5%, still even more preferably about 18%, still even more preferably about 18.5%, still even more preferably about 19%, still even more preferably about 19.5%, still even more preferably about 20%, still even more preferably about 20.5%, still even more preferably about 21%, still even more preferably about 21.5%, still even more preferably about 22%, still even more preferably about 22.5%, still even more preferably about 23%, still even more preferably about 23.5%, still even more preferably about 24%, still even more preferably about 24.5%, and still even more preferably about 25%. The shaped confectionery centers have a percent density reduction of about 5% to about 25%, preferably about 5.25% to about 25%, more preferably about 5.25% to about 20%, even more preferably about 5.5% to about 20%, still even more preferably about 6% to about 15%, still even more preferably the percent density reduction is about 6.5% to about 15%, and most preferably about 7% to about 10%.

Other methods may be employed to manufacture a product having a center with a percent density reduction of at least about 5%.

For example, in one method a fat based confectionery center such as chocolate may be aerated to a target density reduction of 5% or higher. The aerated chocolate could then be deposited in a chocolate mold. The mold may have two parts, which would then be combined to form a "book molded" piece, thus forming a solid center. Alternatively, a top and bottom mold could be secured together (e.g. with magnets) and the aerated chocolate could be added through a small hole in the top mold, thereby forming a single center. The molds would then be chilled to set the chocolate without being subjected to vibration, which could cause the air to escape from the chocolate. The centers would later be removed from the mold and delivered to a panning operation to apply a sugar shell.

Another method would be to deposit a fat based material, e.g. chocolate, into a mold, which is manipulated to create a void in the formed centers. For example, shell molding may be used where chocolate is deposited into a shell mold and inverted to remove excess chocolate, leaving a chocolate shell. The chocolate is cooled and then book molded to form the center. In another embodiment, centers could be made using a spin molding process. Chocolate for the shell is deposited into one part of a mold, which is then sealed and continuously spun. The chocolate is chilled to set its shape. In yet another embodiment, cold press technology may be used. Here, a cold press is pushed into a mold configured to form one half of the center, containing chocolate to form and set a "shell." Two such shells may be formed into a single center by warming the rims of the shell, placing them together then cooling them forming a solid welded piece. The formed centers would then be panned to create a sugar shell.

Though these options could be used to create a sugar shelled fat based center with a percent density reduction greater than 5%, they would be (a) slow and (b) expensive. As such, these methods are impractical especially for making bite-sized lentil shapes.

The invention also includes a panned sugar shelled confectionery product having a center that has a percent density reduction of at least about 5%. The density reduction may be achieved by creating one or more voids in the center. For example, there may be 1, 2, 3, 4, or 5 voids in the center. The voids may be visible, partially visible, homogenous, or non-homogenous.

As previously discussed, the shelled shaped confectionery product of the invention is subjected to thermal cycle testing to demonstrate the robustness of the product.

It is desirable that the panned sugar shelled confectionery product exhibit about 70% or less cracking and bleeding when subjected to thermal cycle treatment. To test the product, the product is placed in a temperature control chamber where the temperature of the chamber is cycled from a temperature of 45° C. for a period of 8 hrs to a temperature of 20° C. for a period of 16 hrs.

Thermal Cycling Test Method

Product in good condition, i.e., without visible cracks and fat bleeding, is placed in a Model 818 Precision™ Brand Incubator (temperature controlled chamber) for at least one thermal cycle, i.e., 24 hrs. During the 24 hour period, the temperature is cycled from 45° C. to 20° C. Initially the temperature is set at 45° C. for 8 hrs and then the temperature setting is lowered to 20° C. for the next 16 hrs. The rate of cooling in the chamber is about 0.41° C./min. The product can be treated to more rigorous testing by keeping the product in the chamber for two, three or four cycles. In such a case, at the end of a cycle, the product is raised from 20° C. to 45° C. at a heating rate of about 0.47° C./min.

The shaped confectionery product of the invention performed extremely well during thermal cycle testing. In Example 1, 0% of product made using the forming pin cracked and bled after one cycle of thermal cycle testing. Just as remarkable is that only 3% of the product made using the invention, cracked and bled after 4 cycles.

By utilizing the forming pin, less than about 70% of the resulting product will crack and bleed after thermal cycle treatment. Preferably less than about 60%, more preferably less than about 50%, even more preferably less than about 40%, still even more preferably less than about 30%, still even more preferably less than about 20%, still even more preferably less than about 15%, still even more preferably less than about 10%, still even more preferably less than about 5%, still even more preferably less than about 3%, and most preferably about 0% will crack and bleed after thermal cycle treatment. Multiple thermal cycle treatments (2 cycles, 3, cycles, 4 cycles, etc.) will produce substantially similar results.

Density Test Method

To measure the density (as specific gravity) of the shaped confectionery centers, an analytical balance equipped with a density measurement kit specific to that balance is used. The centers are weighed in air and then weighed while submerged in a suitable liquid of known density. Analysis is performed using an analytical balance (Mettler Toledo AT-201), density measurement kit (Mettler Toledo 210485), and a thermometer with a scale of 10° C. to 50° C. (0.1° C. gradations). Ethyl alcohol is used as the reagent. The procedure set forth below is followed where (1) the density measurement kit is installed on the balance, (2) the low-form beaker is filled with enough ethyl alcohol to completely cover the sample, (3) the thermometer is suspended in the beaker, (4) the solids sample holder is suspended on the bracket with the basket immersed in the alcohol, (5) the balance is tared, (6) the sample is mixed-well and ten centers are placed on the upper weighing pan and the weight is noted, (7) the balance is tared again, (8) the centers are removed from the upper weighing pan and placed in the lower weighing basket and immerse in the alcohol, and (9) the displayed weight (buoyancy) of the centers is noted.

The density reduction is then calculated by (a) dividing the weight of the centers in step (6) by the weight of the centers in step (9), (b) determining the corrected density of alcohol, (c) multiplying the result of step (a) by the density of alcohol, (d) repeating the procedure above and taking the average as specific gravity.

Note that the specific gravity of pure ethyl alcohol is 0.78934 at 20° C. To determine the density of ethyl alcohol at another temperature, tables found in standard chemistry textbooks may be used.

COMPARATIVE EXAMPLE 1

A panned sugar shelled chocolate centered confectionery product was manufactured using a cold forming apparatus, where chocolate flakes were deposited into a set of forming rolls. The chocolate centers formed had a 13 mm width and depth and a depth of 9.2 mm.

The chocolate centers were then treated to a hard panning operation where a sugar shell coating was applied over the chocolate centers. The amount of sugar shell coating applied was about 32% of the total weight of the product.

The resulting product was examined to select pieces that did not have visible cracks or fat bleeding through the shell. The product selected was then subjected to thermal cycle treatment. Each cycle consisted of heat treating the product for 8 hrs at a temperature of 45° C. and then lowering the temperature to 20° C. for 16 hrs. Samples were cycled 1, 2, 3 and 4 times. The results are presented in Table 1.

TABLE 1

| Sample # | # of Cycles | Percentage exhibiting Cracks and Bleeding* |
|---|---|---|
| Sample 1 | 1 | 75% |
| Sample 2 | 2 | 93% |
| Sample 3 | 3 | 95% |
| Sample 4 | 4 | 90% |

Based on a 40 piece sample size tested for each cycle

EXAMPLE 1

A panned sugar shelled confectionery product was made following the procedure of Comparative Example 1, except that the chocolate centers were formed in an apparatus that utilized the forming pin of the invention. The use of the forming pin resulted in confectionery centers that had a percent density reduction of about 4.65%. The experimental centers had a 13 mm length and width and a depth of 9.2 mm. The forming pocket was designed to form a lip or tail, which sealed the opening in the rolling step. The forming pin was cylindrical and had a depth and width of 2 mm. The length of the body of the forming pin was configured to extend just beyond the top and bottom of the forming pocket when centered at the nip. The centers were then sugar shelled in a hard panning operation where the amount of sugar shell coating applied was about 32% by weight of the total weight of the product. The resulting sugar shelled confectionery centers were examined to select pieces that did not crack or displayed fat bleeding through the shell. The selected pieces were then subjected to the same heat cycle treatment described in Comparative Example 1. The results are presented in Table 2.

TABLE 2

| Sample # | # of Cycles | Percentage exhibiting Cracks and Bleeding* |
|---|---|---|
| Sample 1 | 1 | 0% |
| Sample 2 | 2 | 0% |
| Sample 3 | 3 | 0% |
| Sample 4 | 4 | 3% |

Based on a 40 piece sample size tested for each cycle

Comparative Example 1 and Example 1 demonstrates the robustness of the product made using the invention, which exhibits dramatically less cracking and fat bleeding when subjected to thermal cycling, e.g. temperature changes.

COMPARATIVE EXAMPLE 2

Tempered chocolate from an Aasted tempering system was fed into a holding tank. Chocolate was pumped from the holding tank to an aeration head, which was supplied with a gas. The pressure on the aeration head was approximately 4 bars. Chocolate was continuously circulated through the aeration head and back into the tank. Circulation of the chocolate continued in this manner until the target aeration level was achieved, about 12.5%. Once the target aeration level was achieved, or the maximum level of aeration was reached— about 10% in this test, the chocolate was diverted from the holding tank to the top of a set of chilled forming rolls. The rolls had forming pockets of 12.9 mm width and length, and 6 mm depth. The chocolate was then processed through the chilled forming rolls to form lentil shaped centers. A sample of the aerated chocolate fed to the rolls was collected, to determine the percent aeration. The lentil shaped centers formed were also evaluated to determine the density of the pieces, using the Density Test Method protocol. The sample was allowed to solidify before analysis. Testing was performed using nitrogen gas and compressed air. The results of the testing are provided in Table 3.

TABLE 3

| Comparative Sample | Depth (mm) | Width and Length (mm) | Density (g/ml) | % Aeration in Chocolate | % Density Reduction |
|---|---|---|---|---|---|
| Control | 6.08 | 12.87 × 12.87 | 1.29 | 0.0 | 0.0 |
| 1 | 6.18 | 12.81 × 12.81 | 1.23 | 7.75 | 4.65 |
| 2 | 5.92 | 12.84 × 12.84 | 1.27 | 6.20 | 1.55 |

The percent density reduction of the formed lentil shaped centers was significantly lower than the percent aeration in the chocolate fed into the chilled forming rolls. The compressive forces of the forming rolls appear to reduce the amount of gas trapped in the chocolate, lowering the percent aeration. The highest percent density reduction achieved was only 4.65%.

EXAMPLE 2

A chocolate centered confectionery product was manufactured, where chocolate flakes were deposited into a set of forming blocks compressing and compacting the flakes into a cohesive lentil shape. Two forming blocks had forming pockets in corresponding alignment, where the forming pockets were approximately 12.9 mm in width, 12.9 mm in length, and 6 mm in depth. A forming pin was placed in a groove traversing the forming pockets. Pressure was applied to the two forming blocks using a hydraulic press to compact and compress the chocolate flakes into a unified cohesive piece. The pin was removed from the formed pieces in the forming blocks. The formed pieces were then removed from the blocks. The void left by the pin was sealed manually by smoothing chocolate flakes over the ends of the void. The formed pieces, i.e. chocolate centers, formed had a 12.9 mm width and length, and a 6 mm depth. Table 4 shows the results of testing performed using forming pins of different widths and lengths, resulting in various levels of percent density reduction.

TABLE 4

| Sample | Cylindrical Pin Width and Depth (mm) | Density (g/ml) | % Density Reduction |
|---|---|---|---|
| Control | None | 1.2985 | 0.00% |
| 1 | 1.57 × 1.57 | 1.2468 | 3.98% |
| 2 | 2.31 × 2.31 | 1.1943 | 8.02% |
| 3 | 2.63 × 2.63 | 1.1778 | 9.30% |

By using the forming pin, much higher levels of density reduction were achieved over traditional aeration methods, which at best only achieved a percent density reduction of 4.65%.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. A forming apparatus comprising:
   (a) first and second forming rolls with forming pockets in corresponding alignment, wherein at least one roll has one or more continuous grooves provided in the surface of the roll such that each continuous groove extends around the circumference of the roll in a plane perpendicular to the longitudinal axis of the roll and intersects a plurality of discrete forming pockets intersected by said plane, and
   wherein the first and second forming rolls rotate counter to one another; and
   (b) one or more forming pins positioned between the counter rotating rolls and within the continuous groove of the roll.

2. The apparatus of claim 1, wherein each roll has one or more continuous grooves provided in the surface of the roll such that each continuous groove extends around the circumference of the roll in a plane perpendicular to the longitudinal axis of the roll and intersects the forming pockets intersected by said plane.

3. The apparatus of claim 2, wherein the continuous grooves of the first roll are in corresponding alignment with the continuous grooves of the second roll.

4. The apparatus of claim 1, wherein the plurality of discrete forming pockets intersected by said plane are intersected by more than one continuous groove.

5. The apparatus of claim 1, wherein said forming pin has at least one of the following characteristics: (i) said pin is fixed in position; (ii) said pin oscillates; (iii) said pin is hollow; or (iv) said pin is treated with a surface adhesion reducing agent.

6. The apparatus of claim 1, wherein said forming pin has a width and depth that is about 10% to about 80% of a width and depth of a forming pocket when the forming pockets are mated at the nip of the rolls in exact alignment.

7. The apparatus of claim 1, wherein said forming pin is sized to fill about 0.05% to about 70% by vol. of the total volume of a shaped center formed by the forming pockets when the forming pockets are mated at the nip of the rolls in exact alignment.

8. The apparatus of claim 1, wherein said forming pin is hollow and has an opening for injecting a filling.

* * * * *